United States Patent [19]

Chao et al.

[11] Patent Number: 5,732,184
[45] Date of Patent: Mar. 24, 1998

[54] VIDEO AND AUDIO CURSOR VIDEO EDITING SYSTEM

[75] Inventors: Philip C.J. Chao; Sam Lee, both of Naperville, Ill.

[73] Assignee: Digital Processing Systems, Inc., Florence, Ky.

[21] Appl. No.: 546,244

[22] Filed: Oct. 20, 1995

[51] Int. Cl.$^6$ .............. H04N 5/93; G11B 27/00
[52] U.S. Cl. .................. 386/55; 386/54
[58] Field of Search ............... 386/55, 52, 54, 386/46, 65, 4; 360/13, 32; H04N 5/93; G11B 27/00

[56] References Cited

U.S. PATENT DOCUMENTS

| | | |
|---|---|---|
| 4,538,188 | 8/1985 | Barker .................... 360/14.3 |
| 4,831,445 | 5/1989 | Kawabe . |
| 5,050,003 | 9/1991 | Horii et al. ............... 358/342 |
| 5,053,762 | 10/1991 | Sarra . |
| 5,233,332 | 8/1993 | Watanabe et al. . |
| 5,568,275 | 10/1996 | Norton et al. .............. 386/52 |

*Primary Examiner*—Robert Chevalier
*Attorney, Agent, or Firm*—Welsh & Katz, Ltd.

[57] ABSTRACT

An apparatus and method of editing video sequences. The method includes the steps of displaying a timeline of a video sequence on a timeline on a monitor of an editing computer, placing a movable cursor at a selected location along the timeline, displaying a miniaturized version of a video frame corresponding to the selected location of the timeline adjacent the timeline, and editing the video sequence based upon the displayed video frame.

36 Claims, 5 Drawing Sheets

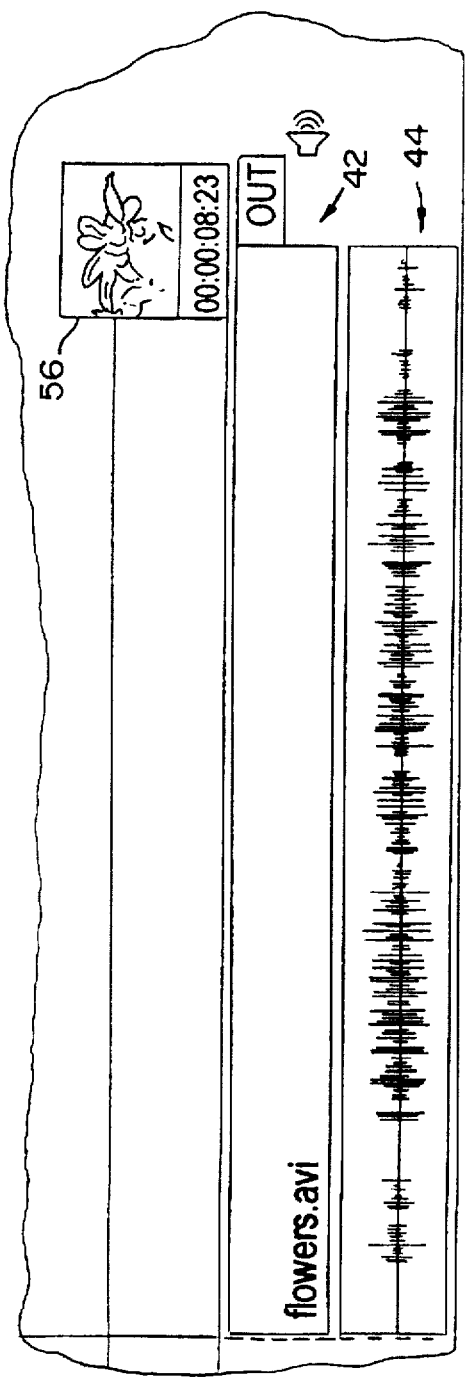
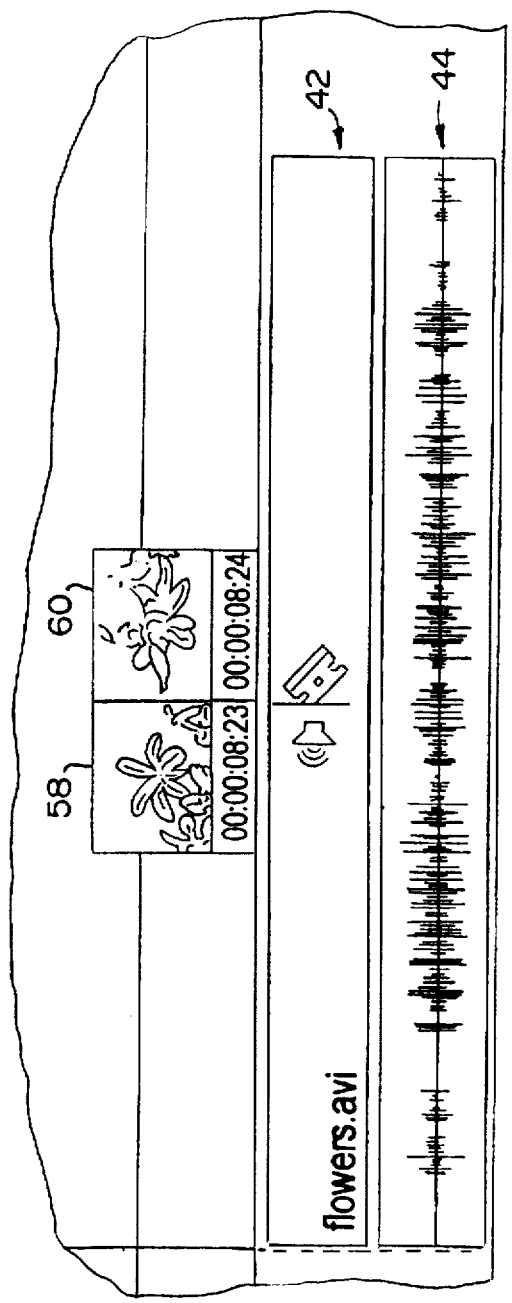

VIDEO AND AUDIO CURSOR VIDEO EDITING SYSTEM

FIELD OF THE INVENTION

The field of the invention relates to video editing and more particularly to computer-based system for editing video and audio sequences.

BACKGROUND OF THE INVENTION

Computer-based systems for editing and composing audio video works are known. More recent systems accept audio video signals from external sources (e.g., video cameras, video cassette recordings (VCRs), laserdisks, etc.) under an analog format and convert the signals to a digital format for further processing. After conversion to a digital format, the converted signals are stored as source files in a memory mass storage device (e.g., hard disk, floppy disk, etc.) in anticipation of further processing.

Analog video signals are received by the computer for conversion one image (frame) at a time at a fixed rate (e.g., 30 frames per second). Each frame is converted into a digital representation of the frame and stored in a memory file containing a sequence of such frames (video sequence). The video files containing the video sequences are identified by a particular name, or by a graphic representation (e.g., one of the frames) of the video sequence.

Editing of video files of video sequences is typically accomplished by dedicating a portion of a monitor of the video editing system for display of the video sequence during playback. During playback, individual frames may be deleted from the beginning or end of the sequence by trimming, or frames may be added or deleted within the sequence to tailor the length or content of the sequence to a particular purpose. Playback of the sequence for editing can occur real-time at a rate of 30 frames per second, or in some systems, the frames may be incremented either forward or backward one frame at a time.

During, or after editing, the clips may be assembled into a finished presentation under a variety of formats. Under one type of system, file icons are dragged onto a timeline of the finished work. Precise concatenation of individual video sequences may by accomplished automatically by the system or manually by an operator.

Gaps are often left between video sequences for the insertion of special features (e.g., headers, titles, subtitles, etc.). Special effects are also available and may be applied to clips that are on the timeline.

Other video editing systems allow for the overlap of video sequences and for the use of transition special effects (e.g., page turn, page roll, fade in/fade out, etc.). Such transition effects usually involve combining elements of two source frame into a single output frame.

While prior art video editing systems are effective in creating original works, the use of such systems may be tedious. With a typical frame rate of 30 frames per second even a one hour movie may involve the processing of over 100,000 frames.

Several modes are currently employed to aid the user in this type of video editing. One mode is referred to as "multiple picture rectangle" in which selected video frames are used to represent the entire video clip. The selected video frames are displayed on a timeline. Since there are typically many more frames in a video clip than can be displayed at one time on the timeline only one every X frames may be displayed. Intermediate frames are not shown. Such a method allows the user a rough idea of the content of the frames along the timeline of the video clip. Problems inherent in such method include a lack of frame accurate precision (i.e., the displayed frames may not be truly representative of video clip content) as well as long update times due to the need to located and retrieve one every X frames within the mass storage device. Once the frames are located, they may have to be decompressed and then shrunk to an appropriate size.

One such mode is a "trimmer window". This is a separate stationary dialog box which displays frame(s) of video clips where trimming actions can be applied. Although frame accuracy is achievable, the trimmer window is still disjoint (i.e., the frames displayed are disjointed from the actual visual flow of the clip), from the clip(s) being edited. Making changes in this trimming window does not provide users with direct timeline feedback. For example because of the disjoint nature of displayed video frames, a timing window does not graphically feedback the exact starting point of a trimmed clip on the timeline. If the operator, desires to trim a precise amount from a clip so that it begins just after another clip on an adjoining track, numeric comparisons must be made in the trimmer window. Although frame accurate, this mechanism is less intuitive than a graphical timeline interface for trimming. Also, trimmer windows usually overlap large portions of the timeline making the overlapped portion invisible and inconvenient to use.

Another mode to aid computer editing is the "preview window". This window is usually activated by the operator when additional feedback is necessary for sensitive operations and reflects the single frame being operated on. Preview windows are stationary and do not move in association with the cursor as editing operations are performed. Thus they lack pictorial feedback as to the exact portion of the clip being edited. The user is forced to switch his focus back and forth between the cursor on one part of the CRT display and the preview window on another part of the CRT display as editing operations are being performed. Due to the nature of video preview, typically only one frame is visible at a time inside the preview window making it less convenient for some editing operations.

Yet another mode, the "all frames display", causes a miniature version of every frame of the video over the short range which can fit into the CRT display (e.g., 20-30 frames). Since 30 frames may only represent one second of video, the overall view of the timeline is lost when the all frames mode is used. If the video clip is much longer than one second in duration (which is typically the case), the operator must scroll back and forth in this mode in order to position the view appropriate for editing operations. Any editing operation spanning more than one second requires the operator to adjust the view in a tedious fashion as well. Another inherent problem is long update times due to the need to pull up all the required frames from a mass storage device, decompress them, and shrink them to a miniature size. Given the massive number of frames involved, a more effective method is needed for accessing individual frames within the frame sequence of a movie during editing.

Accordingly, it is an object of this invention to provide a better access method for the visual display of individual frames of a movie sequence.

It is a further object of the invention to provide an access method that is independent of the movie presentation sequence.

SUMMARY OF THE INVENTION

An apparatus and method of editing video sequences. The method includes the steps of displaying a time rectangle of a video sequence on a timeline on a monitor of an editing computer, placing a movable cursor at a selected location along the time rectangle, displaying a miniature version of a video frame corresponding to the selected location of the time rectangle adjacent the cursor in time rectangle, and editing the video sequence based upon the displayed video frame.

BRIEF DESCRIPTION OF THE DRAWINGS

FIGS. 4a-4d depicts a cursor controlled frame display editing system of the video editing system of FIG. 1;

DETAILED DESCRIPTION OF A PREFERRED EMBODIMENT

Figure 1:
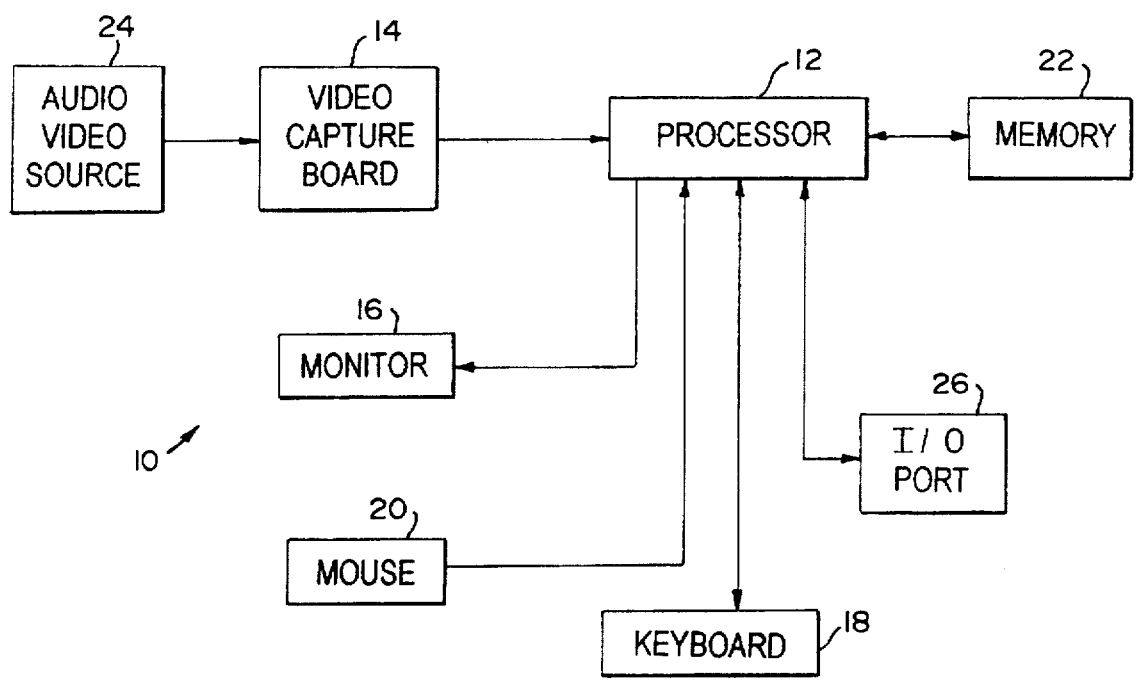
FIG. 1 is a block diagrams of a video editing system in accordance with an embodiment of the invention.

FIG. 1 is a block diagram of a video editing system 10, generally, in accordance with an embodiment of the invention. Included within the video editing system 10 is an processor 12 (e.g., IBM 486 and above, DEC Alpha, etc.) containing an appropriate operating system (e.g., Windows 95, Windows NT, etc.) and application software for performing the editing steps of the inventive process. Associated with the processor 12 is a mass memory storage device 22 (e.g., random access memory (RAM), floppy disk drive, or hard disk drive) for storing audio and video clips (source files), interim audiovisual products, and the final edited version of the editing process. A monitor 16 (e.g., a cathode ray tube (CRT)) is provided for the visual presentation of video clips and as a visual aid in the assembly and editing of the final product. A keyboard 18 and mouse 20 are used for the manipulation and control of the editing process.

Also included within the video editing system 10 is a video capture board 14 for converting an analog input signal received from an external video source 24 into an appropriate digital format for storage within the source data files of the memory 22. As each file is received and stored, it is given an appropriate name (e.g., A, B, C, D).

Data files containing an audiovisual representation of the video signal may be stored under any appropriate format known to the industry (e.g., audio visual interleaved (AVI), Quick Time Movie File by Apple Computer, MPEG formed by Motion Picture Expert Group of ISO, etc.). Audio information (without video) may also be obtained from the audio video source 24 through the video capture board 14. Audio information may also be stored under any appropriate file type known to the industry (e.g., a Way file). Similarly video information (without audio) may be obtained through the video capture board 14 and stored as a sequence of video frames (a video sequence). Other appropriate video, image, audio and graphics formats under which source files may be created include: DIB, bitmap file format (BMP) by MicroSoft, FLI/FLC by Autodesk, GIF by Compuserve, PCX by Xsoft, PCT by Macintosh, Photo CD by Kodak, TGA by TrueVision, TIF by Aldus, and JPG by Joint Photographic Experts Group. As used herein, files (of whatever type) will be referred to as clips.

Digital video segments and audio files may also be loaded for editing through an independent input/output (I/O) port 26. I/O port 26 may be a connector interfacing with any appropriate information source (e.g., floppy disk drive, PCMCIA memory card, etc.). The I/O port 26 may also be used as an output for finished audiovisual works, where the destination may be another memory storage device (e.g., floppy disk drive, PCMCIA memory card, etc.) or another computer.

Following entry of the appropriate source files, an operator (not shown) of the video editing system 10 may access and view the video files A, B, C, D on the monitor 16 under a number of formats. Under a first format, an area on the screen (a window) may be dedicated to the display of the video segment. The operator may view the clip at a normal speed (i.e., 30 frames per second), or, under a second format, the operator may view the clip one frame at a time using menu selections to advance or step back, one frame at a time. As the operator views the clip a frame number (or frame time) is displayed with a frame as well as a reference identifying the file name of the clip. Upon viewing the frames at normal speed (or one frame at a time), the operator may edit the clip by adding frames from other works or deleting unwanted frames. The operator may also join clips into a continuous work under the control of a timeline.

Figure 2:
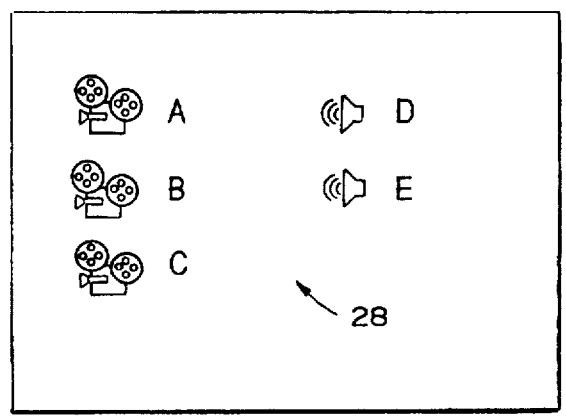
FIG. 2 depicts a screen of source video clips displayed on the monitor of the video editing system of FIG. 1.

To create an audiovisual work the operator first gathers a storyboard 28 (FIG. 2) displayed on the monitor 16 of video and audio clips. The operator creates the storyboard by entering file names A, B, C, D (or by dragging icons) to the storyboard 28. Icons associated with each file may be used to indicate the type of file (e.g., a movie reel for video, a speaker for audio, etc.). The order of file placement on the storyboard 28 may be used as a indication of the order of presentation of the audiovisual clips in the finished work.

Upon completion of the storyboard 28, the operator creates a timeline of the finished work 30 (FIG. 3) which is then displayed on the monitor 16. The timeline 30 may be created by activating an appropriate selection on a pull-down menu or tool bar located along the top of the monitor 16. The files A, B, C, D, E displayed on the storyboard 28 may be manually transferred to the timeline 30 or the processor 12 automatically places the files A, B, C, D, E of the storyboard 28 on the timeline 30 in the same sequential order as shown on the storyboard 28. Video clips A, B, C are placed in the video track V1 32 in adjacent positions as time rectangles 36, 38, 40. The audio clips D, E are, likewise, placed on the audio track A1 34 in adjacent positions as time rectangles 42, 44.

As the files A, B, C, D, E are transferred to the timeline, the icons of the file A, B, C, D, E appear on the individual clips represented by the time rectangles 36, 38, 40, 42, 44. A rectangular box of a width indicative of a time element of the file A, B, C, D, E and containing the name of the file A, B, C, D is placed along a horizontal track (e.g., V1, A1) of the timeline 30. The time element of the clip relates to the size of the clip. For example, if the clip has 30 frames of video then the time element would be one second and the width of the box would correspond to the distance of one second along the timeline. The time rectangles A-E are temporal symbols (e.g., a particular rectangle symbolizes a particular video clip and the horizontal length of the rectangle relates to the duration of the video clip) and are not intended to restrict the type of symbol used under the invention.

For example, in the timeline (FIG. 3), the video clips 36, 38, 40 are shown as being 5 seconds long each. The audio clips 42, 44 are also shown as being 5 seconds each.

Under an embodiment of the invention, video track V1 is the primary source of audiovisual information for the finished work. The second track FX is used for special effects (e.g., page turning, fade in/fade out, etc.) and for transitioning from a first video in track V1 to a second video in track V2. The audio tracks (e.g., A1) are used for sound substitution or mixing with audio of the primary track.

Figure 4C:
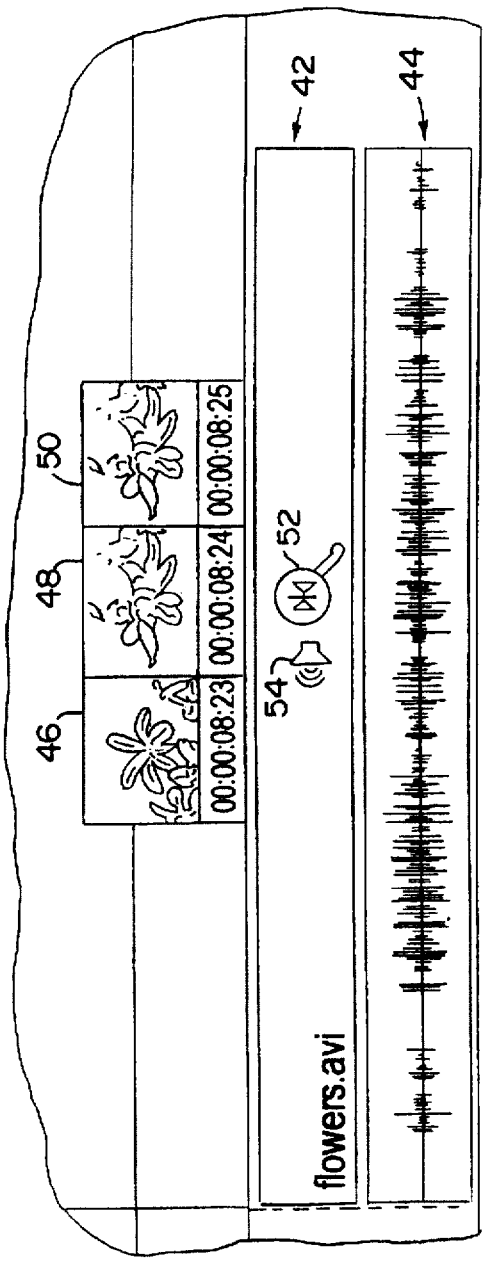
Figure 4D:
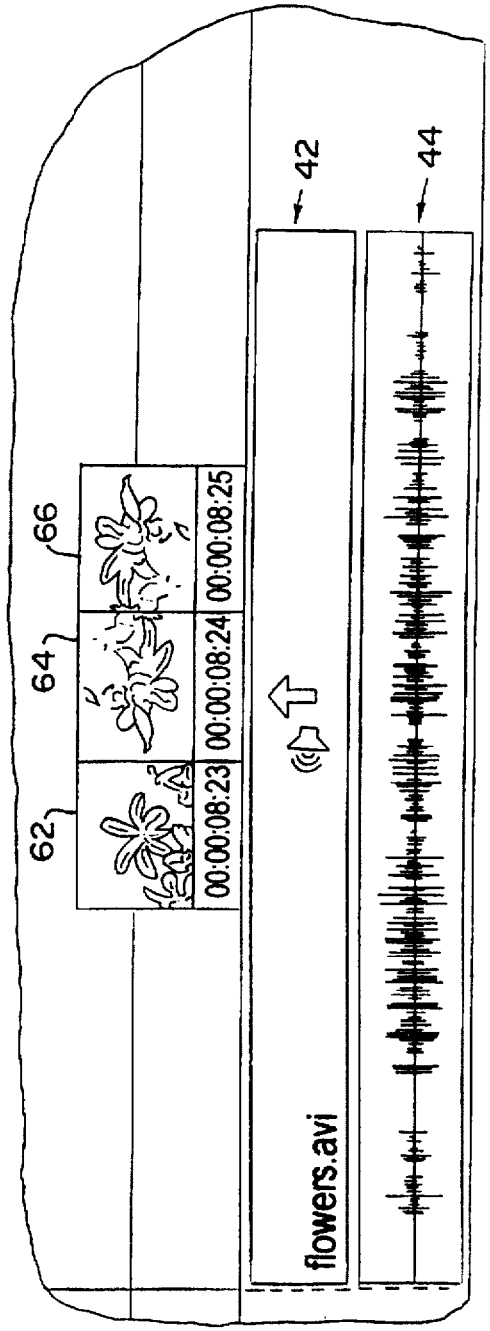

The video clips 36, 38, 40 and audio clips 42, 44 may be individually edited. Further, the video clips 36, 38, 40 may be AVI files containing both video and audio. The video and audio of the AVI video clips 36, 38, 40 may be independently edited by clicking on track V1 32 and selecting menu item DISPLAY VIDEO AND AUDIO. In response, the V1 track 32 is divided vertically FIG. 4) into a top half 42 showing the title of the AVI clip and a bottom half 44 displaying a symbolic representation of a waveform of the clip.

Figure 3:
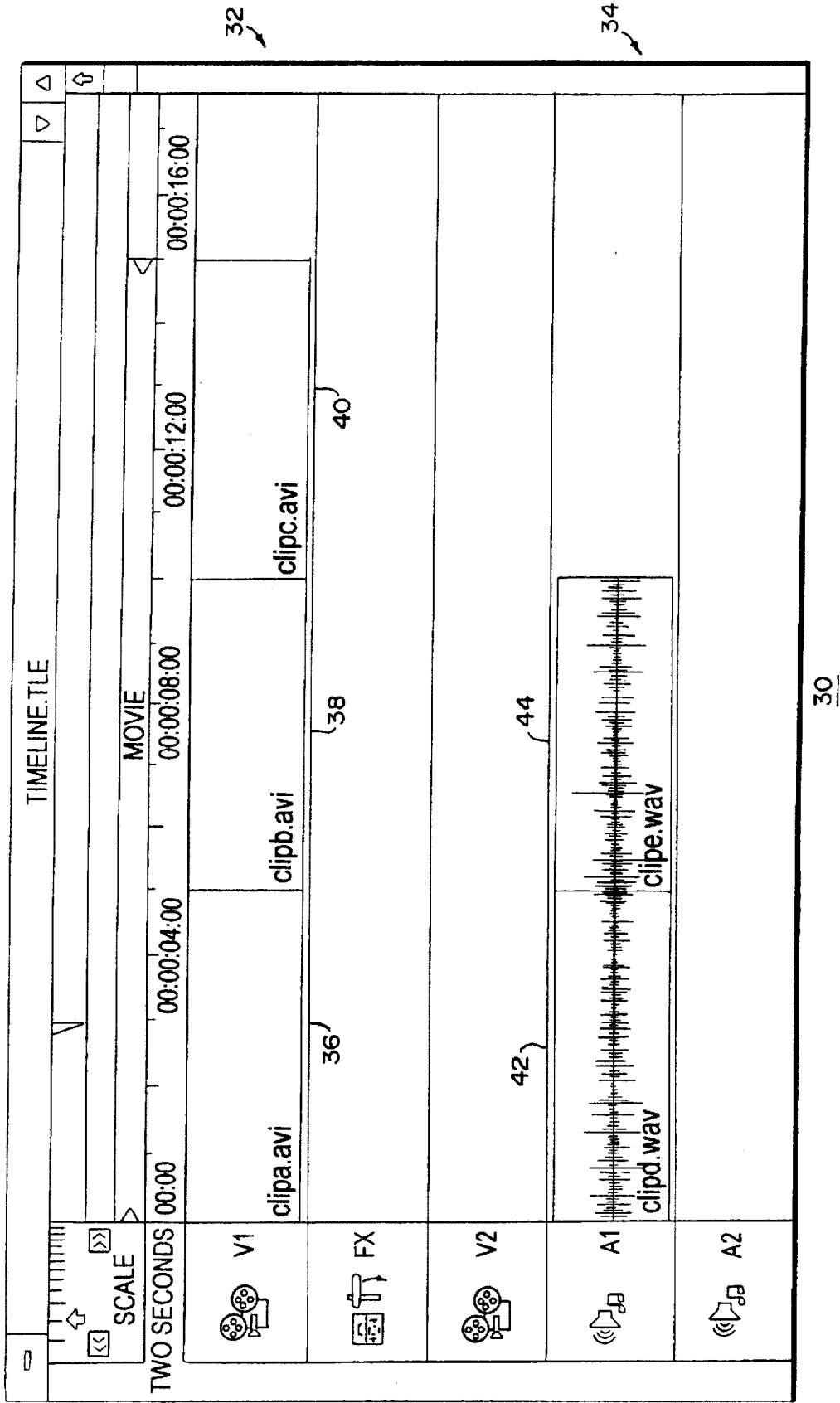
FIG. 3 depicts an editing screen displayed on the monitor of the video editing system of FIG. 1; and, FIG. 4 including

FIGS. 4a–4d shows four separate editing operations that may be performed to the video clips 36, 38, 40 of FIG. 3. For purposes of convenience the video clip of FIGS. 4a–4d is assumed to be an AVI clip labeled "flower" and contains a video of flowers with background music.

Under the embodiment, the operator may first scan the video frames of the AVI file for visual and audio content. Instead of watching the video in sequential order, the operator may enter the frames of the video clip at any point with the aid of a cursor. To do so, the operator selects a menu item resembling a magnifying glass. The operator may also select a menu item resembling a speaker 54. Selection of the magnifying glass allows the operator to visually see a selected portion of adjacent video frames. Selection of the speaker icon allows the operator to hear a selected portion of audio associated with the displayed frames.

As the operator (via the mouse 20) moves a cursor to the video or audio portion 42, 44 of the clip (FIG. 4c), a magnifying glass 52 and speaker 54 appears on the upper half 42 of the V1 track 32 representing the location of the cursor. Three reduced size frames 46, 48, 50 closest the location of the cursor are displayed above the video clip. A repeating sound segment (e.g., one second on each side of the cursor location) is played for the benefit of the operator.

Using the mouse 20, the operator may move the cursor to any location along the timeline of any video clip 36, 38, 40. Where ever the operator places the cursor, the three frames 46, 48, 50 closest the cursor (i.e., beneath and to the left and right of the cursor) will be displayed. Alternatively, if the operator wants to slowly move the cursor along the timeline within a particular video clip 36, 38, 40, the operator uses the directional keys on the keyboard 18. Activating the left or right directional keys of the keyboard 18 causes the cursor to increment to the left or right one frame at a time. As before, the three closest frames are shown and the repeating sound segment are presented for the benefit of the operator.

The processor 12 identifies the frames 46, 48, 50 and audio segment within the file (i.e., flowers) by determining the location of the cursor on the timeline. For example, the first video clip 36 of the timeline 30 is shown to be 5 second long. At 30 frames a second, the clip 36 has 150 frames. If the processor 12 were to determine that the cursor were located at the two second mark, then frame numbers 59, 60, and 61 would be displayed along with the sound associated with those frames.

Similarly, if the editing operation were that of trimming (FIG. 4a), a single frame is displayed above the location of the cursor. For trimming, the processor 12 determines which side of the midpoint of the video clip the cursor has been positioned. Determination of position is important not only to display the proper frame above the cursor location, but also to be able to delete (trim) frames from a current cursor location to one end or other of the clip.

Under the embodiment, the processor 12 determines the cursor location as above. If the cursor has been positioned at the end (right edge) of the clip, the processor displays a flag with the word "OUT" on the right side of the cursor location indicating that the frames from that location to the end of the clip will be deleted upon activation of the mouse 20 or ENTER key. Alternatively, if the processor 12 were to determine that the cursor is located at the beginning (left edge) of the clip the IN flag is displayed on the left side indicating that the frames from the beginning of the clip to the cursor location will be deleted upon activation of the mouse 20 or ENTER key. In either case the edge frame (i.e., either the first frame or last frame in the trimmed clip) is displayed above the cursor location.

During the trimming operation, the operator may move the cursor at will horizontally along the video clip. In response to the movement, the processor 12 always displays a reduced size video frame above the current cursor location. If the operator moves the cursor off the video clip 36, 38, 40, no change is made to the video clip. If, on the other hand, the operator positions the cursor at either the left or right edge of the clip and activates the trim operation, then the frames from the cursor location to the end of the clip are deleted upon activation of the mouse 20 or ENTER key.

Under the embodiment, display of reduced size video images also occurs during slicing (FIG. 4b). The operator elects a slicing operation by clicking on a video clip 36, 38, 40 and selecting an icon of a razor blade from an appropriate menu. As the operator moves the cursor over a video clip 36, 38, 40, the cursor is displayed as a razor blade. The operator may also choose to listen to the audio of the video clip during the slicing operation by selecting an icon of a speaker (FIG. 4b). As the cursor is moved along the video clip, two frames 58, 60 closest to the cursor are displayed above the cursor. As with previous examples the processor 12 identifies the two frames by determining a current position of the cursor and selects the two frames on each side of that position. Another variation of the embodiment is to display two reduced size frames similar to 58 and 60 of FIG. 4b, which are from two different clips for purposes of assisting in aligning clips during the editing operation.

As the operator determines the proper location for slicing, the operator activates the mouse 20 or ENTER button. In addition, the left and right directional keys can be used to position the razor for frame accurate slicing. The result is two video clips, of the same name. The operator may now click on one or the other of the severed video clips and drag them apart for purposes of inserting other video images between the sliced portions.

The novel editing method may also be applied to index marking. Index marking may be used as an indication of a transition point from a first video to a second video and may be used as a means of aligning the second video clip to a temporal location of the first video clip. As above, the operator clicks on a video clip and selects an appropriate icon (e.g., a vertical arrow for index marking). As the operator moves the cursor to the video clip 36, 38, 40, three reduced size frames 62, 64, 66 closest the position of the index cursor are displayed above the video clip. To enter the index mark, the operator actives the mouse 20 or ENTER button.

In another embodiment of the invention, the novel means of visually examining files under cursor control is applied to audio files. Under the embodiment the reduced size box described above is used to display an audio waveform of the audio files 42, 44.

Figure 5:
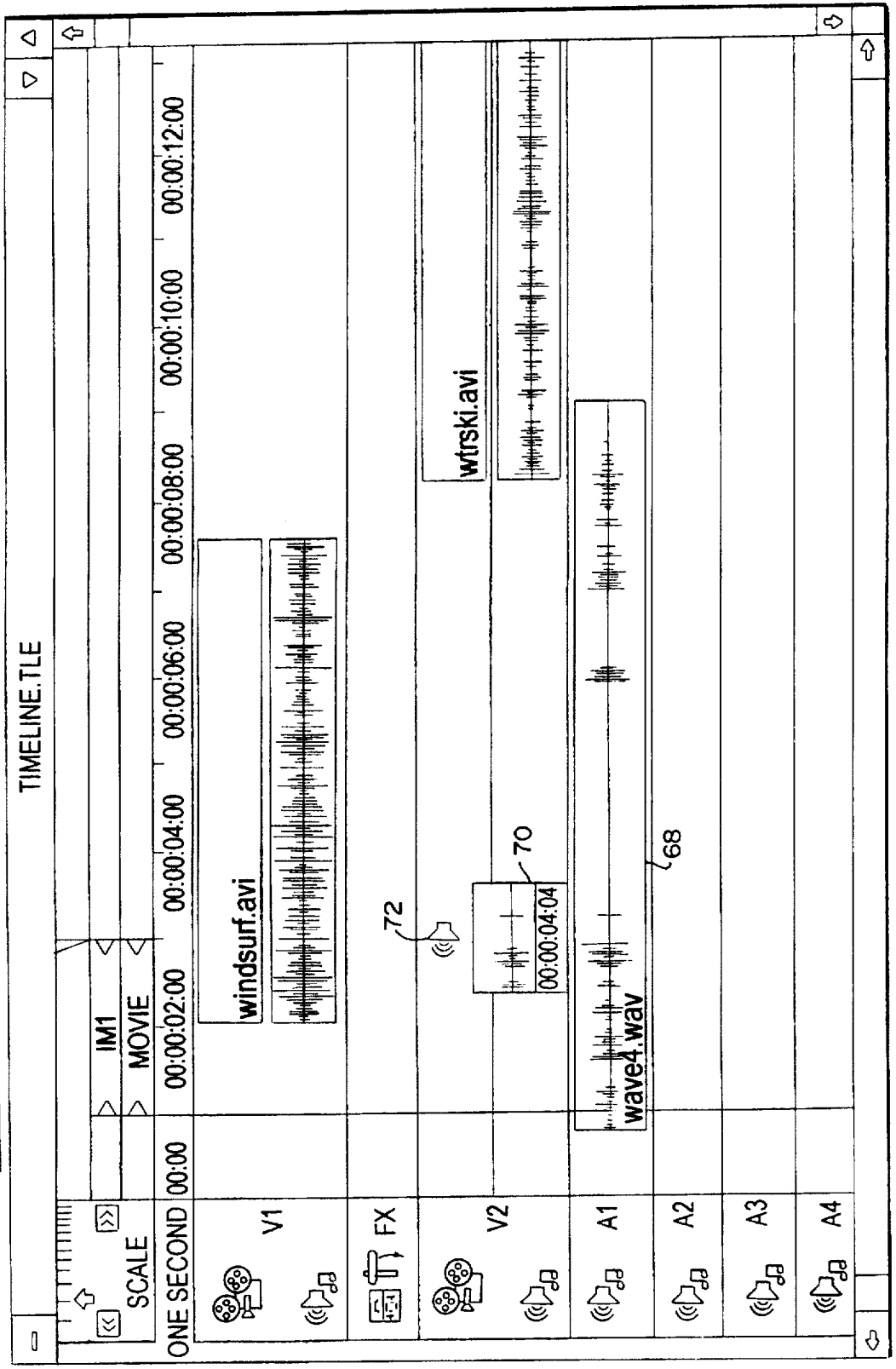
FIG. 5 depicts a timeline of a cursor controlled audio segment display system of the video editing system of FIG. 1.

In FIG. 5, one of the audio files 42, 44 is assumed to be a WAV file 68 named "waves". To view the audio file the operator clicks on the file and selects an icon of a sound wave from a menu. In response, the processor 12 creates a box 70 above a current cursor location and displays an audio waveform of the file for a selected time interval closest the cursor. As above, the time interval may be for one second before and one second after the cursor location or a smaller time interval. Audio waveforms typically contain large numbers of digitized audio samples which are difficult to display in sufficient detail on a timeline during video editing due to the limited resolution of the monitor 16. For example at a 44 kHz sampling rate per channel, there are 88,000 digitized audio samples per second for stereo audio, but only 1,000 pixels in the horizontal direction of most monitors 16. The ability to display audio waveforms corresponding to the selected location of the time rectangle provides a mechanism to zoom-in and reveal full details of the digitized audio samples in the reduced size box 70.

Alternatively, the operator may wish to listen to the sound of the file in addition to viewing the waveform for the selected time interval of the file. To listen to the sound, the operator (in addition to clicking on the waveform) also clicks on the icon of the speaker. In response, the processor 12 also displays a speaker 72 and reproduces the audio content of the file for the selected time interval. In total the operator not only sees the waveform for the selected waveform, but also hears a repeating version of the selected waveform.

To access other areas of the audio file 68, the operator simply moves the cursor to the desired area. Alternately, the operator may use the left and right directional keys of the keyboard 18 to increment through the file one selected time interval at a time. If the selected time interval were to be two seconds, then activating the right directional key would move the cursor to a location on the timeline occurring two seconds later. Pushing the left directional key would move the cursor location to a point occurring two seconds earlier. As with video editing, the operator may trim, slice, or do index marking of audio files as described above.

A specific embodiment of novel apparatus for editing video clips according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A method of editing video sequences comprising the steps of:

displaying a time rectangle of a video sequence on a timeline on a monitor of an editing computer, with a length of the time rectangle extending along the timeline indicative of a temporal length of the video sequence and each frame of the video sequence corresponding to a particular location along the timeline;

placing a movable cursor at a selected temporal location of the time rectangle along the timeline;

displaying adjacent the cursor a miniature version of a video frame of the video sequence of the time rectangle corresponding to the selected temporal location of the cursor; and, editing the video sequence based upon the displayed video frame.

2. The method as in claim 1 further comprising the step of using a computer mouse of the editing computer to place the movable cursor at the selected location of the time rectangle.

3. The method as in claim 1 further comprising the step of using a set of horizontal position keys of a keyboard of the editing computer to increment the selected location to adjacent video frames.

4. The method as in claim 1 wherein the step of editing the video sequence further comprising the step of dividing the video sequence into a first and a second video sequence.

5. The method as in claim 1 further comprising the step of displaying a time rectangle of a second video sequence on the video monitor.

6. The method as of claim 5 further comprising the step of displaying the time rectangles of the first and second video sequences on a common time scale.

7. The method as in claim 5 further comprising the step of designating the video frame at the selected location as a transition point of a video output of the video editing system from the first video sequence to the second video sequence.

8. The method as in claim 7 further comprising the step of aligning the time rectangle of the second video sequence to a temporal location to the designated transition point on the time rectangle of the first video sequence.

9. The method as in claim 8 wherein the step of aligning the time rectangle of the second video sequence to a temporal location to the designated transition point on the time rectangle of the first video sequence further comprises the step of aligning a first frame of the second video sequence to the designated transition point.

10. The method as in claim 8 further comprising the step of storing indicia of frame sequence from the first to the second video sequence based upon the aligned first and second video sequences in a video output file of the video editing system.

11. The method as in claim 10 further comprising the step of outputting a completed video segment as the video output of the video editing system based upon the stored indicia of frame sequence.

12. The method of claim 5 further comprising the step of placing the movable cursor at a selected location on the time rectangle of the second video sequence and displaying a video frame corresponding to the selected location of the second video sequence.

13. The method as in claim 12 further comprising the step of designating the selected location of the second video sequence as a transition point of the video output of the video editing system from the second video sequence to the first video sequence.

14. The method of claim 13 further comprising the step of placing the movable cursor at a selected location on the time rectangle of the first video sequence and displaying a video frame corresponding to the selected location of the first video sequence.

15. The method as in claim 14 further comprising the step of designating the selected location of the first video sequence as a transition point of the video output of the video editing system from the second video sequence to the first video sequence.

16. The method as in claim 15 further comprising the step of aligning the transition point of the first video sequence to the transition point of the second video sequence.

17. The method as in claim 16 further comprising the step of storing indicia of video flow and frame sequence from the first to the second video sequence based upon the aligned first and second video sequences in a video output file of the video editing system.

18. The method as in claim 17 further comprising the step of outputting a completed video segment as the video output of the video editing system based upon the stored indicia of frame sequence.

19. A method of editing audio data files comprising the steps of:

displaying a time rectangle of a audio file on a timeline on a monitor of an editing computer;

placing a movable cursor at a selected temporal location along the time rectangle;

displaying adjacent the cursor a miniature version of an audio waveform of the audio file of the time rectangle of a selected time interval corresponding to the selected temporal location of the cursor; and, editing the audio sequence based upon the displayed audio waveform.

20. The method as in claim 19 further comprising the step of using a computer mouse of the editing computer to place the movable cursor at the selected location of the time rectangle.

21. The method as in claim 19 further comprising the step of using a set of horizontal position keys of a keyboard of the editing computer to increment the selected location to an adjacent location.

22. The method as in claim 19 wherein the step of editing the audio sequence further comprising the step of dividing the audio file into a first and a second audio file.

23. The method as in claim 19 further comprising the step of displaying a time rectangle of a second audio file on the video monitor.

24. The method as of claim 23 further comprising the step of displaying the time rectangles of the first and second audio files on a common time scale.

25. The method as in claim 23 further comprising the step of designating the selected location as a transition point of an audio output of the video editing system from the first audio file to the second audio file.

26. The method as in claim 25 further comprising the step of aligning the time rectangle of the second audio file to the designated transition point on the timeline of the first audio interval.

27. The method as in claim 26 wherein the step of aligning the timeline of the second audio file to the designated transition point on the time rectangle of the first audio file further comprises the step of aligning a first interval of the second audio interval to the designated transition point.

28. The method as in claim 26 further comprising the step of storing indicia of audio transitioning from the first to the second audio file based upon the aligned first and second audio file in a video output file of the video editing system.

29. The method as in claim 28 further comprising the step of outputting a completed audio video segment as the audio video output of the video editing system based upon the stored indicia of transitioning.

30. The method of claim 23 further comprising the step of placing the movable cursor at a selected location on the timeline of the second audio file and displaying an audio waveform corresponding to the selected location of the second audio file.

31. The method as in claim 30 further comprising the step of designating the selected location of the second audio file as a transition point of the audio video output of the audio video editing system from the second audio file to the first audio file.

32. The method of claim 31 further comprising the step of placing the movable cursor at a selected location on the time rectangle of the first audio file and displaying a selected audio file corresponding to the selected location of the first audio file.

33. The method as in claim 32 further comprising the step of designating the selected location of the first audio file as a transition point of the video output of the audio video editing system from the second audio file to the first audio file.

34. The method as in claim 33 further comprising the step of aligning the transition point of the first audio file to the transition point of the second audio file.

35. The method as in claim 34 further comprising the step of storing indicia of transitioning from the first to the second audio file based upon the aligned first and second audio files in a audio video output file of the audio video editing system.

36. The method as in claim 35 further comprising the step of outputting a completed audio video segment as the audio video output of the video editing system based upon the stored indicia of transitioning.

* * * * *